United States Patent
Hondo et al.

(10) Patent No.: US 12,091,479 B2
(45) Date of Patent: Sep. 17, 2024

(54) EPOXY RESIN COMPOSITION FOR FIBER-REINFORCED COMPOSITE MATERIAL, FIBER-REINFORCED COMPOSITE MATERIAL, AND PRODUCTION METHOD THEREOF

(71) Applicant: Toray Industries, Inc., Tokyo (JP)

(72) Inventors: Kazunori Hondo, Nagoya (JP); Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 791 days.

(21) Appl. No.: 17/253,674

(22) PCT Filed: Jun. 17, 2019

(86) PCT No.: PCT/JP2019/023849
§ 371 (c)(1),
(2) Date: Dec. 18, 2020

(87) PCT Pub. No.: WO2020/008847
PCT Pub. Date: Jan. 9, 2020

(65) Prior Publication Data
US 2021/0261744 A1     Aug. 26, 2021

(30) Foreign Application Priority Data

Jul. 6, 2018   (JP) ................................ 2018-128729
Jan. 10, 2019  (JP) ................................ 2019-002431

(51) Int. Cl.
| | | |
|---|---|---|
| C08F 220/32 | (2006.01) | |
| C08F 36/06 | (2006.01) | |
| C08G 59/24 | (2006.01) | |
| C08G 59/32 | (2006.01) | |
| C08G 59/50 | (2006.01) | |
| C08J 5/24 | (2006.01) | |
| C08L 51/04 | (2006.01) | |
| C08L 63/00 | (2006.01) | |

(52) U.S. Cl.
CPC .......... *C08F 220/325* (2020.02); *C08F 36/06* (2013.01); *C08G 59/245* (2013.01); *C08G 59/3227* (2013.01); *C08G 59/5033* (2013.01); *C08J 5/243* (2021.05); *C08J 5/249* (2021.05); *C08L 51/04* (2013.01); *C08L 63/00* (2013.01); *C08J 2363/00* (2013.01); *C08J 2451/04* (2013.01); *C08L 2205/18* (2013.01); *C08L 2207/53* (2013.01)

(58) Field of Classification Search
CPC ....... C08F 220/325; C08F 36/06; C08J 5/249; C08J 5/243; C08J 2363/00; C08J 2451/04; C08G 59/245; C08G 59/3227; C08G 59/5033; C08L 51/04; C08L 63/00; C08L 2205/18; C08L 2207/53
USPC ....................................................... 525/526
See application file for complete search history.

(56) References Cited

U.S. PATENT DOCUMENTS

| | | | |
|---|---|---|---|
| 4,988,469 A | 1/1991 | Reavely et al. | |
| 6,054,221 A | 4/2000 | Weigel et al. | |
| 7,709,582 B2 | 5/2010 | Kouchi et al. | |
| 2015/0315331 A1 | 11/2015 | Misumi et al. | |
| 2016/0326301 A1 | 11/2016 | Mason et al. | |
| 2017/0326819 A1 | 11/2017 | Meegan et al. | |

FOREIGN PATENT DOCUMENTS

| | | | |
|---|---|---|---|
| EP | 0366068 B1 | 5/1990 | |
| JP | 02198815 A | 8/1990 | |
| JP | 11511503 A | 10/1999 | |
| JP | 2003103519 A | 4/2003 | |
| JP | 2003277532 A | 10/2003 | |
| JP | 2004315572 A | 11/2004 | |
| JP | 4396274 B2 | 1/2010 | |
| JP | 2010150310 A | * 7/2010 | |
| JP | 2013181112 A | 9/2013 | |
| JP | 5808057 B2 | 11/2015 | |

(Continued)

OTHER PUBLICATIONS

"JP2010150310_Machine Translation" is a machine translation of JP-2010150310-A. (Year: 2010).*
Miyoshi et al., JP 2010-150310 A machine translation in English, Jul. 8, 2010. (Year: 2010).*
International Search Report and Written Opinion for International Application No. PCT/JP2019/023849, dated Sep. 10. 2019. 7 pages.
Supplementary European Search Report for European Application No. 19831456.9, dated Apr. 13, 2022, 6 pages.

*Primary Examiner* — David T Karst

(74) *Attorney, Agent, or Firm* — Buchanan Ingersoll & Rooney PC

(57) ABSTRACT

The present invention provides: an epoxy resin composition which has satisfactory handleability during refrigerated transport, is stable and inhibited from increasing in viscosity for a long period even when held at ordinary temperature, well infiltrates into reinforcing fibers, can be sufficiently rapidly cured at a temperature as high as 180° C., and gives molded objects that can be smoothly demolded in a demolding step after the molding since the resin has sufficiently cured and has high heat resistance imparted thereto; and a fiber-reinforced composite material obtained using the epoxy resin composition. The epoxy resin composition for use in producing fiber-reinforced composite materials comprises an epoxy resin and a hardener, and includes tetraglycidyldiaminodiphenylmethane [A], 4,4'-methylenebis(2-isopropyl-6-methylaniline) [B], and a bisphenol F type epoxy resin [C] in a specific proportion, and satisfies $200 \leq \eta 30/\eta 80 \leq 500$ and $50 \leq \eta 80 \leq 180$, where the viscosities of the resin at 30° C. and 80° C. are expressed by $\eta 30$ and $\eta 80$ respectively (unit, mPa·s).

11 Claims, No Drawings

(56) References Cited

FOREIGN PATENT DOCUMENTS

| | | |
|---|---|---|
| JP | 2016147925 A | 8/2016 |
| JP | 2017506279 A | 3/2017 |
| JP | 2017159652 A | 9/2017 |
| WO | 2014112180 A1 | 7/2014 |

* cited by examiner

EPOXY RESIN COMPOSITION FOR FIBER-REINFORCED COMPOSITE MATERIAL, FIBER-REINFORCED COMPOSITE MATERIAL, AND PRODUCTION METHOD THEREOF

CROSS REFERENCE TO RELATED APPLICATIONS

This is the U.S. National Phase application of PCT/JP2019/023849, filed Jun. 17, 2019, which claims priority to Japanese Patent Application No. 2018-128729, filed Jul. 6, 2018 and Japanese Patent Application No. 2019-002431, filed Jan. 10, 2019, the disclosures of each of these applications being incorporated herein by reference in their entireties for all purposes.

FIELD OF THE INVENTION

The present invention relates to an epoxy resin composition for a fiber-reinforced composite material that is preferably used as a fiber-reinforced composite material such as an aerospace member or an automobile member, a fiber-reinforced composite material in which the epoxy resin composition is used, and a method for producing the fiber-reinforced composite material.

BACKGROUND OF THE INVENTION

A fiber-reinforced composite material that includes a reinforcing fiber and a matrix resin can be designed using advantages of the reinforcing fiber and the matrix resin, so that the fiber-reinforced composite material has been more widely used in the fields of aerospace, sports, general industry, and the like.

As the reinforcing fiber, fibers such as glass fibers, aramid fibers, carbon fibers, and boron fibers are used. As the matrix resin, both thermosetting resins and thermoplastic resins are used. The thermosetting resins easily impregnated into the reinforcing fibers are more often used. As the thermosetting resin, resins such as epoxy resins, unsaturated polyester resins, vinyl ester resins, phenol resins, bismaleimide resins, and cyanate resins are used.

As a method of molding a fiber-reinforced composite material, methods such as a prepreg method, hand lay-up, filament winding, pultrusion, and resin transfer molding (RTM) are employed. The prepreg method is a method in which prepregs produced by impregnating a reinforcing fiber with an epoxy resin composition are stacked in a desired shape and heated to obtain a molded product. Although suitable for producing fiber-reinforced composite materials having high material strength required for structural material applications for aircraft, automobiles, and the like, the prepreg method is not suitable for mass production and has a problem in the productivity because the prepreg method needs many processes such as production and stacking of prepregs, and only small production is possible. Meanwhile, the RTM method is a method in which a liquid epoxy resin composition is injected and impregnated into a reinforcing fiber substrate placed in a heated mold, and heat-cured in the mold to obtain a molded product. In this method, a fiber-reinforced composite material can be molded in a short time by preparing a mold without a step of preparing a prepreg, and in addition, there is an advantage that a fiber-reinforced composite material having a complicated shape can be easily molded.

As the liquid epoxy resin composition, a one-pack type or a two-pack type epoxy resin composition is used. The one-pack type epoxy resin composition is an epoxy resin composition in which all components including an epoxy resin and a curing agent are premixed together. The two-pack type epoxy resin composition is an epoxy resin composition that includes an epoxy main agent liquid containing an epoxy resin as a main component and a curing agent liquid containing a curing agent as a main component and is obtained by mixing the two liquids, the epoxy main agent liquid and the curing agent liquid immediately before use.

In the case of the two-pack type epoxy resin composition, both the epoxy main agent liquid and the curing agent liquid need to be liquid, therefore the selection of the raw materials is restricted. Furthermore, because an expensive mixing injector for mixing the epoxy main agent liquid and the curing agent liquid and injecting the mixture into a mold is needed, the cost for equipment investment is large. In the case of the one-pack type epoxy resin composition, it is possible to select a solid state component that can exhibit a high mechanical property as a curing agent component, and there is no need for equipment investment in a mixing injector because a step of mixing an epoxy resin and a curing agent is not needed.

For the above-described reason, the one-pack type epoxy resin composition is often used in the RTM method, and in order to achieve a high-level productivity, it is specifically required not only that the curing time of the resin be short, but also that all of the four conditions listed below be satisfied. First, the one-pack type epoxy resin composition needs refrigeration transportation because the curing reaction proceeds during the transportation, and at that time, from the viewpoint of handleability, the one-pack type epoxy resin composition is required to have high viscosity to prevent the resin composition from moving in a container. Second, it is required that the increase in the viscosity be suppressed for a long time even under hold at room temperature and the resin composition be stable. Third, the resin composition is required to have low viscosity during the step of injecting the resin into a reinforcing fiber substrate and to have an excellent impregnation property. Fourth, it is required that sufficient high-speed curing be possible at a high temperature of 180° C., and during the step of releasing the molded product after the molding, the resin be sufficiently cured, high heat resistance be imparted to smoothly release the molded product without distortion, and the molded product have high dimensional accuracy.

In response to such a current situation, a one-pack type epoxy resin composition containing methylenebis (3-chloro-2, 6-diethylaniline) (M-CDEA) as a curing agent is disclosed, and a method has been proposed in which the increase in the viscosity can be suppressed for a long time (Patent Document 1). Furthermore, a one-pack type epoxy resin composition is disclosed in which a fluoreneamine curing agent is partially dispersed as a solid, and a method has been proposed in which the increase in the viscosity can be suppressed for a long time (Patent Document 2).

Furthermore, a two-pack type epoxy resin composition including a main agent liquid containing tetraglycidyl-diaminodiphenylmethane and a curing agent liquid containing diaminodiphenylsulfone is disclosed, and a method has been proposed in which an excellent impregnation property is imparted, sufficient high-speed curing is possible at 180° C., and during the step of releasing the molded product after the molding, the resin is sufficiently cured and high heat resistance can be imparted (Patent Document 3).

PRIOR ART DOCUMENTS

Patent Documents

Patent Document 1: Japanese Patent No. 5808057
Patent Document 2: Japanese Patent Laid-open Publication No. 11-511503
Patent Document 3: Japanese Patent No. 4396274

SUMMARY OF THE INVENTION

In the above-described method described in Patent Document 1, although the increase in the viscosity can be suppressed for a long time, the resin composition has an insufficient impregnation property because the viscosity is high, the curability at a high temperature of 180° C. is low because methylenebis (3-chloro-2, 6-diethylaniline) (M-CDEA) having low reactivity is contained, and there is a problem that sufficient high heat resistance is not exhibited in a short time.

In the above-described method described in Patent Document 2, although the increase in the viscosity can be suppressed for a long time, the fluoreneamine curing agent partially dispersed as a solid aggregates in some cases, the handleability is poor in such cases because the resin phase having low viscosity moves in a container during the refrigeration transportation, the impregnation property is insufficient because the resin composition has high viscosity, the fluoreneamine curing agent partially remains unmelted even at a high temperature of 180° C. in some cases because the fluoreneamine curing agent has an extremely high melting point of 201° C., poor curing is caused, and there is a problem that sufficient high heat resistance is not exhibited.

In the above-described method described in Patent Document 3, an excellent impregnation property is imparted, sufficient high-speed curing is possible at 180° C., and during the step of releasing the molded product after the molding, the molded product can be smoothly released because the resin is sufficiently cured and high heat resistance can be imparted. However, because both the main agent liquid and the curing agent liquid of the two-pack type epoxy resin composition are liquid and have low viscosity, each liquid moves in a container during the refrigeration transportation, and in some cases, it cannot be said that the handleability is sufficiently good.

As described above, in the conventional techniques, there is a problem that it is difficult to satisfy all of the above-described four conditions, and in particular, there has been no technique to satisfy the first condition to improve the resin handleability during the refrigeration transportation. Therefore, an object of the present invention is to overcome the defects of the conventional techniques and to provide an epoxy resin composition having good handleability during the refrigeration transportation, stability due to the suppression of the increase in the viscosity for a long time even under hold at room temperature, and an excellent impregnation property into a reinforcing fiber. The epoxy resin composition can be cured at sufficiently high speed at a high temperature of 180° C., and during the step of releasing the molded product after the molding, the molded product can be smoothly released because the resin is sufficiently cured and high heat resistance is imparted. Furthermore, an object of the present invention is to provide a fiber-reinforced composite material having excellent 0° compressive strength under wet heat by using such an epoxy resin composition.

In order to solve the above-described problems, the epoxy resin composition for a fiber-reinforced composite material according to embodiments of the present invention has the following configuration. That is, the epoxy resin composition is an epoxy resin composition for a fiber-reinforced composite material, the epoxy resin composition including: an epoxy resin; and a curing agent, the epoxy resin composition used for production of a fiber-reinforced composite material in which the epoxy resin composition is injected and impregnated into a reinforcing fiber substrate placed in a heated mold, and cured in the mold, wherein tetraglycidyl-diaminodiphenylmethane [A] is contained at a content of 70 parts by mass or more and 90 parts by mass or less based on 100 parts by mass of all epoxy resin components, 4,4'-methylenebis (2-isopropyl-6-methylaniline) [B] is contained at a content of 80 parts by mass or more and 100 parts by mass or less based on 100 parts by mass of a total curing agent component, a bisphenol F type epoxy resin [C] is contained at a content of 10 parts by mass or more and 30 parts by mass or less based on 100 parts by mass of all the epoxy resin components, and a resin viscosity at 30° C. represented by $\eta_{30}$ (unit: mPa·s) and a resin viscosity at 80° C. represented by $\eta_{80}$ (unit: m·Pas) satisfy $200 \leq \eta_{30}/\eta_{80} \leq 500$ and $50 \leq \eta_{80} \leq \eta_{80}$.

Furthermore, the fiber-reinforced composite material according to embodiments of the present invention includes the epoxy resin cured product of the epoxy resin composition and a reinforcing fiber substrate in combination.

According to embodiments of the present invention, it is possible to provide an epoxy resin composition for a fiber-reinforced composite material having good handleability during the refrigeration transportation, stability due to the suppression of the increase in the viscosity for a long time even under hold at room temperature, and an excellent impregnation property. The epoxy resin composition can be cured at sufficiently high speed at a high temperature of 180° C., and during the step of releasing the molded product after the molding, the molded product can be smoothly released because the resin is sufficiently cured and high heat resistance is imparted. Furthermore, a fiber-reinforced composite material having high 0° compressive strength under wet heat can be obtained with the epoxy resin composition.

DETAILED DESCRIPTION OF EMBODIMENTS OF THE INVENTION

Hereinafter, desirable embodiments of the present invention will be described.

First, an epoxy resin composition for a fiber-reinforced composite material in the present invention will be described.

The epoxy resin composition for a fiber-reinforced composite material according to embodiments of the present invention is an epoxy resin composition including: an epoxy resin; and a curing agent, the epoxy resin composition used for production of a fiber-reinforced composite material in which the epoxy resin composition is injected and impregnated into a reinforcing fiber substrate placed in a heated mold, and cured in the mold, wherein tetraglycidyldiamino-diphenylmethane [A] is contained at a content of 70 parts by mass or more and 90 parts by mass or less based on 100 parts by mass of all epoxy resin components, 4, 4'-methylenebis (2-isopropyl-6-methylaniline) [B] is contained at a content of 80 parts by mass or more and 100 parts by mass or less based on 100 parts by mass of a total curing agent component, a bisphenol F type epoxy resin [C] is contained at a content of 10 parts by mass or more and 30 parts by mass or less based on 100 parts by mass of all the epoxy resin components, and a resin viscosity at 30° C. represented by $\eta_{30}$ (unit: mPa·s) and a resin viscosity at 80° C. represented by $\eta_{80}$ (unit: m·Pas) satisfy $200 \leq \eta_{30}/\eta_{80} \leq 500$ and $50 \leq \eta_{80} \leq \eta_{80}$.

The resin composition containing [A], [B], and [C] at a content of the above-described parts by mass and satisfying the above-described viscosity range realizes the improvement, that is difficult by the conventional techniques, in the handleability during the refrigeration transportation. The resin composition is stable because the increase in the viscosity is suppressed for a long time even under hold at room temperature, has an excellent impregnation property, and can be cured at sufficiently high speed at a high temperature of 180° C. Furthermore, during the step of releasing the molded product after the molding, the molded product can be smoothly released because the resin is sufficiently cured and high heat resistance is imparted. In the obtained fiber-reinforced composite material, the 0° compressive strength under wet heat can be improved.

[A] in embodiments of the present invention is tetraglycidyldiaminodiphenylmethane. [A] is a component necessary for imparting high heat resistance and a high mechanical property to an epoxy resin cured product and the fiber-reinforced composite material. Here, the term "tetraglycidyldiaminodiphenylmethane" of [A] refers to N, N, N',N'-tetraglycidyldiaminodiphenylmethane, or its derivative or isomer. Examples of the tetraglycidyldiaminodiphenylmethane include N, N, N', N'-tetraglycidyl-4, 4'-diaminodiphenylmethane, N, N, N', N'-tetraglycidyl-3, 3'-dimethyl-4, 4'-diaminodiphenylmethane, N, N, N', N'-tetraglycidyl-3, 3'-diethyl-4, 4'-diaminodiphenylmethane, N, N, N', N'-tetraglycidyl-3, 3'-diisopropyl-4, 4'-diaminodiphenylmethane, N, N, N', N'-tetraglycidyl-3, 3'-di-t-butyl-4, 4'-diaminodiphenylmethane, N, N, N', N'-tetraglycidyl-3, 3'-dimethyl-5, 5'-diethyl-4, 4'-diaminodiphenylmethane, N, N, N', N'-tetraglycidyl-3, 3'-diisopropyl-5, 5'-diethyl-4, 4'-diaminodiphenylmethane, N, N, N', N'-tetraglycidyl-3, 3'-diisopropyl-5, 5'-dimethyl-4, 4'-diaminodiphenylmethane, N, N, N', N'-tetraglycidyl-3, 3'-di-t-butyl-5, 5'-diethyl-4, 4'-diaminodiphenylmethane, N, N, N', N'-tetraglycidyl-3, 3'-di-t-butyl-5, 5'-dimethyl-4, 4'-diaminodiphenylmethane, N, N, N', N'-tetraglycidyl-3, 3', 5, 5'-tetramethyl-4, 4'-diaminodiphenylmethane, N, N, N', N'-tetraglycidyl-3, 3', 5, 5'-tetraethyl-4, 4'-diaminodiphenylmethane, N, N, N', N'-tetraglycidyl-3, 3', 5, 5'-tetraisopropyl-4, 4'-diaminodiphenylmethane, N, N, N', N'-tetraglycidyl-3, 3', 5, 5'-tetra-t-butyl-4, 4'-diaminodiphenylmethane, N, N, N', N'-tetraglycidyl-3, 3'-dichloro-4, 4'-diaminodiphenylmethane, and N, N, N', N'-tetraglycidyl-3, 3'-dibromo-4, 4'-diaminodiphenylmethane. Furthermore, two or more kinds of the tetraglycidyldiaminodiphenylmethane may be used in combination as [A].

As commercial products of the tetraglycidyldiaminodiphenylmethane, "SUMI-EPOXY (registered trademark)" ELM434 (manufactured by SUMITOMO CHEMICAL COMPANY, LIMITED), YH434L (manufactured by Nippon Steel & Sumikin Chemical Co., Ltd.), "jER (registered trademark)" 604 (manufactured by Mitsubishi Chemical Corporation), "Araldite (registered trademark)" MY720, "Araldite (registered trademark)" MY721 (above all manufactured by Huntsman Advanced Materials LLC.), and the like can be used.

[A] in embodiments of the present invention is required to be contained at a content of 70 parts by mass or more and 90 parts by mass or less based on 100 parts by mass of all the epoxy resin components. In the case that [A] is contained at a content of 70 parts by mass or more based on 100 parts by mass of all the epoxy resin components, the epoxy resin cured product exhibits high heat resistance, and the 0° compressive strength of the fiber-reinforced composite material under wet heat is improved. In the case that [A] is contained at a content of 90 parts by mass or less, the viscosity of the resin composition at the resin impregnation temperature is reduced, and the impregnation property into the reinforcing fiber substrate is improved. From this viewpoint, the content of [A] is preferably within the range of 80 parts by mass or more and 90 parts by mass or less. Note that in the present invention, the term "epoxy resin cured product" refers to a cured product obtained by curing the epoxy resin composition.

[C] in embodiments of the present invention is a bisphenol F type epoxy resin. [C] is a component necessary for reducing the viscosity of the resin composition at the resin impregnation temperature and improving the impregnation property into the reinforcing fiber substrate. Furthermore, [C] is a component necessary for imparting a high mechanical property to the epoxy resin cured product and the fiber-reinforced composite material. Here, the bisphenol F type epoxy resin of [C] has a structure in which two phenolic hydroxyl groups of bisphenol F are glycidylated.

Examples of the commercial product of the bisphenol F type epoxy resin include "jER (registered trademark)" 806, "jER (registered trademark)" 807, "jER (registered trademark)" 1750, "jER (registered trademark)" 4004P, "jER (registered trademark)" 4007P, "jER (registered trademark)" 4009P (above all manufactured by Mitsubishi Chemical Corporation), "EPICLON (registered trademark)" 830 (manufactured by DIC Corporation), "Epotohto (registered trademark)" YDF-170, "Epotohto (registered trademark)" YDF2001, and "Epotohto (registered trademark)" YDF2004 (above all manufactured by Nippon Steel & Sumikin Chemical Co., Ltd.). Examples of the commercial product of a tetramethylbisphenol F type epoxy resin that is an alkyl substitution product include "Epotohto (registered trademark)" YSLV-80XY (manufactured by Nippon Steel & Sumikin Chemical Co., Ltd.).

[C] in embodiments of the present invention is required to be contained at a content of 10 parts by mass or more and 30 parts by mass or less based on 100 parts by mass of all the epoxy resin components. In the case that [C] is contained at a content of 10 parts by mass or more based on 100 parts by mass of all the epoxy resin components, the viscosity of the resin composition at the resin impregnation temperature is reduced and the impregnation property into the reinforcing fiber substrate is improved to prevent the reinforcing fiber substrate from being unimpregnated, and the epoxy resin cured product exhibits high toughness and high elastic modulus. In the case that the content of [C] is 30 parts by mass or less, high heat resistance is exhibited. From this viewpoint, the content of [C] is preferably within the range of 10 parts by mass or more and 25 parts by mass or less based on 100 parts by mass of all the epoxy resin components.

The epoxy resin composition for a fiber-reinforced composite material according to the present invention may contain an epoxy resin other than [A] and [C] as long as the content of the epoxy resin other than [A] and [C] is 20 parts by mass or less based on 100 parts by mass of all the epoxy resin components. Examples of the epoxy resin other than

[A] and [C] include one or more kinds of epoxy resins selected from bisphenol type epoxy resins other than [C], phenol novolac type epoxy resins, cresol novolac type epoxy resins, resorcinol type epoxy resins, phenol aralkyl type epoxy resins, naphthol aralkyl type epoxy resins, dicyclopentadiene type epoxy resins, epoxy resins having a biphenyl skeleton, isocyanate modified epoxy resins, tetraphenylethane type epoxy resins, triphenylmethane type epoxy resins, triglycidylamine type epoxy resins, and the like. One kind, or two or more kinds of the epoxy resins other than [A] and [C] may be contained.

More specific examples of the epoxy resin other than [A] and [C] include bisphenol A diglycidyl ether, tetrabromobisphenol A diglycidyl ether, bisphenol AD diglycidyl ether, 2, 2', 6, 6'-tetramethyl-4, 4'-biphenol diglycidyl ether, diglycidyl ether of 9, 9-bis (4-hydroxyphenyl) fluorene, triglycidyl ether of tris (p-hydroxyphenyl) methane, tetraglycidyl ether of tetrakis (p-hydroxyphenyl) ethane, phenol novolac glycidyl ether, cresol novolac glycidyl ether, glycidyl ether of a condensate of phenol and dicyclopentadiene, glycidyl ether of a biphenylaralkyl resin, triglycidyl isocyanurate, 5-ethyl-1, 3-diglycidyl-5-methylhydantoin, an oxazolidone type epoxy resin obtained by addition of bisphenol A diglycidyl ether and tolylene isocyanate, a phenol aralkyl type epoxy resin, and triglycidyl aminophenol. Among the epoxy resins, the bisphenol type epoxy resins other than [C] are preferably used because they excellently contribute to the balance between the toughness and the heat resistance of the epoxy resin cured product. In particular, liquid bisphenol type epoxy resins excellently contribute to the impregnation property into the reinforcing fiber, and therefore they are preferably used as the epoxy resin other than [A] and [C]. Note that in the present invention, the term "liquid" means that the viscosity at 25° C. is 1,000 Pa's or less. The term "solid" means that no fluidity is imparted or extremely low fluidity is imparted at 25° C., and specifically the viscosity at 25° C. is more than 1,000 Pa·s. Here, the viscosity is measured in accordance with "Method for viscosity measurement by cone-and-plate viscometer" in JIS Z8803 (1991) using an E type viscometer equipped with a standard cone rotor (1°34'×R24) (such as TVE-30H manufactured by TOKIMEC INC.).

Here, the bisphenol type epoxy resin other than [C] is a bisphenol compound, other than bisphenol F, in which two phenolic hydroxyl groups are glycidylated. Examples of the bisphenol type epoxy resin other than [C] include bisphenol A type epoxy resins, bisphenol AD type epoxy resins, and bisphenol S type epoxy resins, and include also substitution products of these bisphenol compounds, such as halogen substitution products, alkyl substitution products, and hydrogenated products, in which two phenolic hydroxyl groups are glycidylated. As the bisphenol type epoxy resin, not only a monomer but also a polymer having a plurality of repeating units can be preferably used. In the case that the bisphenol type epoxy resin other than [C] is contained, the content is preferably 20 parts by mass or less based on 100 parts by mass of all the epoxy resin components from the viewpoint of the balance between the toughness and the heat resistance of the epoxy resin cured product.

Examples of the commercial product of the bisphenol A type epoxy resin include "jER (registered trademark)" 825, "jER (registered trademark)" 826, "jER (registered trademark)" 827, "jER (registered trademark)" 828, "jER (registered trademark)" 834, "jER (registered trademark)" 1001, "jER (registered trademark)" 1002, "jER (registered trademark)" 1003, "jER (registered trademark)" 1004, "jER (registered trademark)" 1004AF, "jER (registered trademark)" 1007, "jER (registered trademark)" 1009 (above all manufactured by Mitsubishi Chemical Corporation), "EPICLON (registered trademark)" 850 (manufactured by DIC Corporation), "Epotohto (registered trademark)" YD-128 (manufactured by Nippon Steel & Sumikin Chemical Co., Ltd.), "DER (registered trademark)"-331, and "DER (registered trademark)"-332 (manufactured by The Dow Chemical Company).

Examples of the commercial product of the bisphenol S type epoxy resin include "EPICLON (registered trademark)" EXA-1515 (manufactured by DIC Corporation).

[B] in embodiments of the present invention is 4, 4'-methylenebis (2-isopropyl-6-methylaniline). [B] is a component necessary for realizing high-speed curing of the resin composition and imparting a high mechanical property to the epoxy resin cured product and the fiber-reinforced composite material. Examples of the commercial product of the 4, 4'-methylenebis (2-isopropyl-6-methylaniline) include "Lonzacure (registered trademark)" M-MIPA (manufactured by Lonza).

[B] in embodiments of the present invention is required to be contained at a content of 80 parts by mass or more and 100 parts by mass or less based on 100 parts by mass of the total curing agent component. In the case that [B] is contained at a content of 80 parts by mass or more based on 100 parts by mass of the total curing agent component, high-speed curability at a high temperature of 180° C. is exhibited. Furthermore, the low-temperature viscosity at −20° C. is high, and the handleability during the refrigeration transportation is good. The room temperature viscosity at 25° C. is also high, the molecular motion is suppressed in the epoxy and the curing agent, and the curing reaction is suppressed. Therefore, the increase in the viscosity is suppressed for a long time even under hold at room temperature, and the epoxy and the curing agent are stable. Meanwhile, the viscosity at a resin impregnation temperature of 80° C. is sufficiently low, and the impregnation property is good. Furthermore, the 0° compressive strength of the fiber-reinforced composite material under wet heat is improved. From this viewpoint, the content of [B] is more preferably within the range of 90 parts by mass or more and 100 parts by mass or less based on 100 parts by mass of the total curing agent component.

The epoxy resin composition for a fiber-reinforced composite material according to the present invention may contain, as a curing agent other than [B], a compound having an active group capable of reacting with the epoxy resin as long as the content of the compound is less than 20 parts by mass based on 100 parts by mass of the total curing agent component. Examples of the active group capable of reacting with the epoxy resin include an amino group and an acid anhydride group. The higher the storage stability of the epoxy resin composition is, the more preferable the epoxy resin composition is, and the curing agent other than [B] is preferably solid at room temperature because a liquid curing agent generally has high reactivity.

The curing agent other than [B] is preferably an aromatic amine. The curing agent other than [B] more preferably has 1 to 4 phenyl groups in the molecule from the viewpoints of heat resistance and a mechanical property. The curing agent other than [B] is still more preferably an aromatic polyamine compound in which at least one phenyl group contained in the skeleton of the curing agent of the epoxy resin has an amino group at the ortho or meta position because imparting flexibility to the molecular skeleton improves the resin elastic modulus to contribute to the improvement of the mechanical property.

Specific examples of the aromatic polyamine compound include metaphenylenediamine, diaminodiphenylmethane, diaminodiphenylsulfone, metaxylylenediamine, diphenyl-p-dianiline, their various derivatives such as alkyl substitution products, and isomers having an amino group at a different position. These curing agents can be used singly or in combination of two or more kinds thereof. Among the curing agents, diaminodiphenylmethane and diaminodiphenylsulfone are preferable from the viewpoint of imparting high heat resistance to the epoxy resin cured product.

Examples of the commercial product of the curing agent of the aromatic polyamine compound include SEIKACURE-S (manufactured by Wakayama Seika Kogyo Co., Ltd.), MDA-220 (manufactured by Mitsui Chemicals, Inc.), "jERCURE (registered trademark)" W (manufactured by Mitsubishi Chemical Corporation), 3,3'-DAS (manufactured by Mitsui Chemicals, Inc.), "Lonzacure (registered trademark)" M-DEA (manufactured by Lonza), "Lonzacure (registered trademark)" M-DIPA (Manufactured by Lonza), "Lonzacure (registered trademark)" M-CDEA (manufactured by Lonza), and "Lonzacure (registered trademark)" DETDA 80 (manufactured by Lonza).

In the present invention, the ratio H/E of the total number of the active hydrogens of the amine compound contained in the curing agent (H) to the total number of the epoxy groups contained in the epoxy resin (E) is preferably 1.1 or more and 1.4 or less. H/E is more preferably 1.2 or more and 1.3 or less. In the case that H/E is 1.1 or more, a good effect of improving the curability and an effect of improving the plastic deformation ability of the epoxy resin cured product are easily obtained. In the case that H/E is 1.4 or less, high heat resistance is likely to be exhibited.

The epoxy resin composition for a fiber-reinforced composite material according to the present invention may include a core-shell rubber particle. The core-shell rubber particle is excellent in that it is likely to impart high toughness to the fiber-reinforced composite material. Here, the term "core-shell rubber particle" refers to a particle including a particle-shaped core portion containing a polymer such as a crosslinked rubber as a main component, in which a part or the whole of the surface of the core is covered with a polymer different from the polymer contained in the core portion by a method such as graft polymerization.

Examples of the component included in the core portion of the core-shell rubber particle include polymers obtained by polymerizing one kind or a plurality of kinds of monomers selected from conjugated diene-based monomers, acrylic ester-based monomers, and methacrylic ester-based monomers, and silicone resins. Specific examples of the conjugated diene-based monomer include butadiene, isoprene, and chloroprene. The polymer used as the component included in the core portion is preferably a crosslinked polymer formed using the conjugated diene-based monomers singly or in combination of two or more kinds thereof. It is preferable that butadiene be used as the conjugated diene-based monomer, that is, the polymer used as the component included in the core portion be a polymer obtained by polymerizing monomers including butadiene particularly because the polymer obtained has a good property and is easy to obtain by polymerization.

The shell portion of the core-shell rubber particle is preferably graft-polymerized with the above-described core portion, and is preferably chemically bonded to the polymer particle included in the core portion. Examples of the component included in the shell portion include polymers obtained by polymerizing one kind or a plurality of kinds of compounds selected from (meth) acrylic esters, aromatic vinyl compounds, and the like. In order to stabilize the dispersion state, it is preferable to introduce, to the component included in the shell portion, a functional group that reacts with the component included in the epoxy resin composition for a fiber-reinforced composite material according to the present invention, that is, that reacts with the epoxy resin or the curing agent of the epoxy resin. In the case that such a functional group is introduced, good dispersibility can be achieved because the affinity with the epoxy resin is improved, and the component included in the shell portion can finally react with the epoxy resin composition and be incorporated into the epoxy resin cured product. As a result, a sufficient effect of improving the toughness can be obtained by blending only a small amount of the core-shell rubber particle, and the toughness can be improved while the glass transition temperature Tg and the elastic modulus are maintained. Examples of such a functional group include a hydroxyl group, a carboxyl group, and an epoxy group. Among the functional groups, the epoxy group is preferable because the affinity between the shell component and the epoxy resin composition according to the present invention is enhanced and good dispersibility can be exhibited. That is, the core-shell rubber particle preferably includes an epoxy group in the shell portion.

Examples of the method of introducing such a functional group into the shell portion include a method in which one kind or a plurality of kinds of components including such a functional group, such as acrylic esters and methacrylic esters, are graft-polymerized on the surface of the core as a partial component of the monomer.

The core-shell rubber particle preferably has a volume average particle diameter of 50 nm or more and 300 nm or less, and more preferably 50 nm or more and 150 nm or less. The volume average particle diameter can be measured using a NANOTRAC particle size distribution measuring device (manufactured by NIKKISO CO., LTD., by a dynamic light scattering method). Alternatively, a thin section of the epoxy resin cured product, that is prepared by a microtome is observed by a TEM, and from an obtained TEM image, the volume average particle diameter can be measured using image processing software. In this case, it is needed to use the average of values of at least 100 particles. In the case that the volume average particle diameter is 50 nm or more, the core-shell rubber particle has an appropriately small specific surface area and is advantageous in terms of energy, and therefore aggregation is less likely to occur and the effect of improving the toughness is high. In the case that the volume average particle diameter is 300 nm or less, the distance between the core-shell rubber particles is appropriately small, and the effect of improving the toughness is high.

It is more preferable that the epoxy resin composition for a fiber-reinforced composite material according to the present invention include the core-shell rubber particle including an epoxy group in the shell portion, and the core-shell rubber particle have a volume average particle diameter in the range of 50 nm or more and 300 nm or less. If the epoxy resin composition for a fiber-reinforced composite material includes the core-shell rubber particles satisfying such a condition, the core-shell rubber particles are easily dispersed particularly uniformly and well in the epoxy resin composition, and an excellent effect of improving the toughness is easily exhibited.

The method of producing the core-shell rubber particle is not particularly limited, and the particle produced by a known method can be used. As the commercial product of the core-shell rubber particle, for example, "PARALOID (registered trademark)" EXL-2655 (manufactured by Rohm and Haas Company) that includes a butadiene/alkyl methacrylate/styrene copolymer, "STAPHYLOID (registered trademark)" AC-3355 and TR-2122 (manufactured by Ganz Chemical Co., Ltd.) that include an acrylic ester/methacrylic ester copolymer, "PARALOID (registered trademark)" EXL-2611 and EXL-3387 (manufactured by Rohm and Haas Company) that include a butyl acrylate/methyl methacrylate copolymer, or the like can be used. Furthermore, a core-shell rubber particle having a three-layer structure can also be used in which a core layer of a glassy polymer having a glass transition temperature of room temperature or more, such as STAPHYLOID IM-601 and IM-602 (manufactured by Ganz Chemical Co., Ltd.) is covered with an intermediate layer of a rubbery polymer having a low Tg, and the intermediate layer is further covered with a shell layer. A mass of these core-shell rubber particles is usually crushed and treated as powder, and the powdery core-shell rubber is often dispersed again in a thermosetting resin composition. However, this method has a problem that it is difficult to stably disperse the particles in a state without aggregation, that is, in the state of primary particles. To solve this problem, the core-shell rubber particles are not taken out in a massive form even once from the production process, and the core-shell rubber particles are used that can be finally handled in a state of a component of the thermosetting resin, such as a masterbatch in which primary particles are dispersed in the epoxy resin to obtain a preferable dispersion state. The core-shell rubber particle that can be handled in the state of a masterbatch can be produced by, for example, the method described in Japanese Patent Laid-open Publication No. 2004-315572. In the method, first, a suspension in which the core-shell rubber particles are dispersed is obtained by a method of polymerizing a core-shell rubber in an aqueous medium, represented by emulsion polymerization, dispersion polymerization, and suspension polymerization. Next, an organic solvent exhibiting partial solubility in water, such as a ketone-based solvent such as acetone or methyl ethyl ketone, or an ether-based solvent such as tetrahydrofuran or dioxane, is mixed with the suspension, then the mixture is brought into contact with a water-soluble electrolyte such as sodium chloride or potassium chloride, the organic solvent layer and the water layer are phase-separated, and the water layer is removed to obtain an organic solvent in which the core-shell rubber particles are dispersed. Next, an epoxy resin is mixed, then the organic solvent is removed by evaporation to obtain a masterbatch in which the core-shell rubber particles are dispersed in the epoxy resin in the state of primary particles. As the core-shell rubber particle-dispersed epoxy masterbatch produced by such a method, "Kane Ace (registered trademark)" commercially available from KANEKA CORPORATION can be used.

The content of the core-shell rubber particle is preferably 1 part by mass or more and 10 parts by mass or less, and more preferably 1 part by mass or more and 8 parts by mass or less based on 100 parts by mass of all the epoxy resin components. In the case that the content is 1 part by mass or more, an epoxy resin cured product having high toughness is easily obtained. In the case that the content is 10 parts by mass or less, an epoxy resin cured product having a high elastic modulus is easily obtained, and the dispersibility of the core-shell rubber particle in the resin is likely to be good.

As a method of mixing the core-shell rubber particle with the epoxy resin composition for a fiber-reinforced composite material, a generally used dispersion method can be used. Examples of the method include methods in which a triple roll, a ball mill, a bead mill, a jet mill, a homogenizer, a rotation/revolution mixer, or the like is used. Furthermore, a method in which the above-described core-shell rubber particle-dispersed epoxy masterbatch is mixed can also be preferably used. However, even if the core-shell rubber particles are dispersed in the state of primary particles, reaggregation sometimes occurs due to excessive heating or a decrease in the viscosity. Therefore, when the core-shell rubber particles are dispersed and blended, and mixed and kneaded with another component after the dispersion, the temperature and the viscosity are preferably in the range in which the reaggregation of the core-shell rubber particles does not occur. Specifically, if the kneading is performed at a temperature of, for example, 150° C. or more although the temperature depends on the composition, there is a possibility that the viscosity of the composition will decrease and aggregation will occur, therefore, the kneading is preferably performed at a temperature less than the above-described temperature. However, in the case that the temperature reaches 150° C. or more during the curing process, the temperature can exceed 150° C. because gelation occurs during the temperature rise and prevents reaggregation.

In embodiments of the present invention, when the epoxy resin composition for a fiber-reinforced composite material has a resin viscosity at 30° C. represented by $\eta_{30}$ (unit: mPa·s) and a resin viscosity at 80° C. represented by $\eta_{80}$ (unit: mPa·s) that are measured with an E type viscometer, the viscosities are required to satisfy $200 \leq \eta_{30}/\eta_{80} \leq 500$ and $50 \leq \eta_{80} \leq \eta_{80}$. In the case that $200 \leq \eta_{30}/\eta_{80} \leq 500$, the low-temperature viscosity at −20° C. is sufficiently high, the handleability during the refrigeration transportation is good, the room temperature viscosity at 25° C. is also sufficiently high, the molecular motion is suppressed in the epoxy and the curing agent, and the curing reaction is suppressed. Therefore, when the components are mixed and the viscosity after stirring for 1 minute is represented by $\eta_{25(T0)}$ and the viscosity after standing for 1 month at 25° C. is represented by $\eta_{25(T1)}$, the viscosity increase rate after the standing for 1 month at 25° C. $\eta_{25(T1)}/\eta_{25(T0)}$ is 1.10 or less, the increase in the viscosity is suppressed for a long time even under hold at room temperature, and the epoxy resin composition is stable. Meanwhile, the viscosity at a resin impregnation temperature of 80° C. is sufficiently low, the impregnation property is good, the dependence of the viscosity on the temperature is high, and both the contradictory properties can be achieved. In the case that $\eta_{80}$ is 50 mPa·s or more, the viscosity at the resin impregnation temperature is not too low, and during injecting the epoxy resin composition into the reinforcing fiber substrate, the reinforcing fiber substrate can be prevented from being, by a pit generated by entraining air, unimpregnated. In the case that $\eta_{80}$ is 180 mPa·s or less, the viscosity at the resin impregnation temperature is sufficiently low, therefore, the impregnation property into the reinforcing fiber substrate is good, and the reinforcing fiber substrate can be prevented from being unimpregnated.

In the epoxy resin composition for a fiber-reinforced composite material according to embodiments of the present invention, an epoxy resin cured product cured at 180° C. for 40 minutes preferably has a glass transition temperature Tg of 180° C. or more and 200° C. or less. The heat resistance of the fiber-reinforced composite material depends on the glass transition temperature of the epoxy resin cured product obtained by curing the epoxy resin composition. By setting the Tg to 180° C. or more, the heat resistance of the epoxy resin cured product is easily ensured. Furthermore, by setting the Tg to 200° C. or less, the curing shrinkage of the epoxy resin composition is suppressed, and in addition, it is easy to prevent deterioration of the surface quality of the fiber-reinforced composite material, that is caused by the difference in the thermal expansion between the epoxy resin composition and the reinforcing fiber. From the viewpoint of the relationship between the heat resistance and the surface quality, the glass transition temperature Tg is more preferably 185° C. or more and 200° C. or less. As described above, the term "curing time" means the time from the start of injecting the epoxy resin composition into a mold to the start of releasing a molded product. Here, the glass transition temperature Tg of the epoxy resin cured product obtained by curing the epoxy resin composition is determined by measurement using a dynamic viscoelasticity measurement (DMA) device. That is, DMA measurement is performed under a temperature rise using a rectangular test piece cut out from a cured resin plate, and the temperature at the inflection point of the obtained storage elastic modulus G' is regarded as Tg. The measurement conditions are as described in Examples.

The curability of the epoxy resin composition for a fiber-reinforced composite material in embodiments of the present invention depends on the vitrification time of the resin composition at a molding temperature of, for example, 180° C. The shorter the vitrification time of the epoxy resin composition at 180° C. is, the higher the curability is and the shorter the curing time to form the fiber-reinforced composite material is. Therefore, in the RTM method that is particularly used in the fields of aircraft and automobiles in which productivity is important, the vitrification time of the epoxy resin composition at 180° C. is preferably 40 minutes or less, and the shorter the time is, the more preferable the epoxy resin composition is. Here, the vitrification time can be measured as follows. The dynamic viscoelasticity of the epoxy resin composition is measured at a predetermined temperature using a thermosetting measuring device such as ATD-1000 (manufactured by Alpha Technologies), and the complex viscosity is determined from the torque increase accompanying the curing reaction progress. At this time, the time until the complex viscosity reaches $1.0 \times 10^7$ Pa·s is regarded as the vitrification time.

The fiber-reinforced composite material according to the present invention can be obtained by, for example, injecting an epoxy resin composition including an epoxy resin and a curing agent into a reinforcing fiber substrate placed in a heated mold, impregnating the epoxy resin composition into the reinforcing fiber substrate, and curing the epoxy resin composition in the mold. As a specific method of the molding, as described above, the RTM method is preferably used from the viewpoints of productivity and the degree of freedom in the shape of the molded body to be obtained. Furthermore, in the method for producing a fiber-reinforced composite material, it is preferable to select an appropriate condition depending on the fiber-reinforced composite material to be obtained because the degree of freedom to cope with various shapes and sizes of molded bodies can be obtained. For example, it is preferable to use a mold having a plurality of injection ports and inject the epoxy resin composition from the plurality of injection ports at the same time or sequentially with a time difference. The number and the shape of the injection ports are not limited, and the larger the number is, the more preferable the mold is because injection in a short time is possible, and the arrangement is preferable in which the resin flow length can be shortened in accordance with the shape of the molded product.

The method for producing a fiber-reinforced composite material according to embodiments of the present invention includes: injecting the epoxy resin composition for a fiber-reinforced composite material according to embodiments of the present invention, the epoxy resin composition heated to 50° C. or more and 120° C. or less, into a reinforcing fiber substrate placed in a mold heated to 90° C. or more and 180° C. or less; impregnating the epoxy resin composition into the reinforcing fiber substrate; and curing the epoxy resin composition in the mold. The epoxy resin composition for a fiber-reinforced composite material is heated before the injection to a temperature selected from the range of 50° C. or more and 120° C. or less based on the relationship between the initial viscosity and the viscosity increase of the epoxy resin composition from the viewpoint of the impregnation property into the reinforcing fiber substrate. The temperature of the mold is 90° C. or more and 180° C. or less. By setting the temperature of the mold to 90° C. or more and 180° C. or less, the time required for curing is shortened, and at the same time, the thermal contraction after releasing the molded product is relaxed to obtain a fiber-reinforced composite material having good surface quality.

The injection pressure of the epoxy resin composition is usually 0.1 MPa or more and 1.0 MPa or less. A vacuum assist resins transfer molding (VaRTM) method can also be used in which the resin composition is injected by vacuum suction in the mold. From the viewpoints of injection time and economical efficiency of equipment, the injection pressure of the epoxy resin composition is preferably 0.1 MPa or more and 0.6 MPa or less. Even in the case of pressure injection, the inside of the mold is preferably subjected to vacuum suction before injecting the resin composition because a void can be suppressed.

As the reinforcing fiber substrate used in the method for producing a fiber-reinforced composite material, a preform is often used in which sheet-shaped substrates such as reinforcing fiber fabrics are stacked, shaped, and processed using a hot-melt binder (tackifier) into a form close to a desired product form. As the hot-melt binder, either thermoplastic resin or thermosetting resin can be applied. The form of the binder is not particularly limited, and forms of films, tapes, long fibers, short fibers, spun yarns, woven fabrics, knits, nonwoven fabrics, nets, particles, and the like can be used. Among the forms, the particle forms and the nonwoven fabric forms can be particularly preferably used. Note that the binder having a particle form is referred to as a binder particle, and the binder having a nonwoven fabric form is referred to as a binder nonwoven fabric.

In the case that the particle form is used as the form of the binder, the binder preferably has an average particle diameter of 10 μm or more and 500 μm or less. Here, the term "average particle diameter" refers to the median diameter, and the average particle diameter of the binder particle can be measured using, for example, a laser diffraction type particle size distribution meter. In the case that the average particle diameter is less than 10 μm, the adhesive strength and the workability of the obtained preform is sometimes reduced. From this viewpoint, the average particle diameter is more preferably 30 μm or more. In the case that the average particle diameter is more than 500 μm, the reinforcing fiber in the obtained preform sometimes waves, and the mechanical property of the obtained fiber-reinforced composite material is sometimes deteriorated. From this viewpoint, the average particle diameter is more preferably 300 μm or less.

In the case that the nonwoven fabric form is used as the form of the binder, the fiber included in the nonwoven fabric preferably has an average diameter of 10 μm or more and 300 µm or less. Here, the average diameter is determined by observing the cross section of the binder nonwoven fabric with a scanning electron microscope, measuring the diameter of 100 fibers arbitrarily selected, and calculating the arithmetic average of the measured diameter values. In the case that the cross-sectional shape of the fiber is not a perfect circle, the short diameter is measured as the diameter. In the case that the average diameter is less than 10 µm, the adhesive strength of the preform is sometimes reduced. In the case that the average diameter is more than 300 µm, the reinforcing fiber in the preform sometimes waves, and the mechanical property of the obtained fiber-reinforced composite material is sometimes deteriorated. From this viewpoint, the average diameter is more preferably 100 µm or less.

The binder is attached to at least the surface of the reinforcing fiber substrate, and the resulting product is used as a reinforcing fiber substrate with a binder. The reinforcing fiber substrate with a binder has the above-described binder on at least the surface and is used in the preform.

In the case that the binder is attached to the surface, the binder is preferably attached to one side or both sides at a basis weight of 0.5 g/m$^2$ or more and 50 g/m$^2$ or less, and more preferably 1 g/m$^2$ or more and 30 g/m$^2$ or less per one side. In the case that the amount of the attached binder is less than 0.5 g/m$^2$, the form of the obtained preform is sometimes difficult to fix. In the case that the amount of the attached binder is more than 50 g/m$^2$, the impregnation property of the matrix resin is poor and a void is sometimes generated.

In the present invention, the reinforcing fiber substrate is preferably a preform having a connection by a binder having a nonwoven fabric form. By using a nonwoven fabric form as the binder form, the binder can be evenly placed on the substrate, therefore, the flow path for impregnation of the matrix resin is easily ensured. As a result, the impregnation property is particularly excellent, and a void is extremely unlikely to be generated. Even if the amount of the attached binder is less than that in the case of the particle form, the effect of fixing the form of the obtained preform is easily maintained at the same level as in the case of the particle form. Furthermore, when the fiber-reinforced composite material is obtained, the high heat resistance and the mechanical property that are originally possessed by the matrix resin are likely to be exhibited.

Specifically, in the case that a normal binder such as a binder having a particle form is attached to the surface, the binder is preferably attached to one side or both sides at a basis weight of 0.5 g/m$^2$ or more and 50 g/m$^2$ or less, and more preferably 1 g/m$^2$ or more and 30 g/m$^2$ or less per one side as described above. In the case of the nonwoven fabric form, the basis weight can be 0.5 to 15 g/m$^2$ while the effect of fixing the form of the obtained preform is maintained at the same level as in the case of the normal binder.

The preform is produced by stacking reinforcing fiber substrates with a binder that have the above-described binder on at least the surface and fixing the form. The binder is attached to at least the surface of at least one side of the reinforcing fiber substrate by heating to form a reinforcing fiber substrate with a binder, and then a plurality of the reinforcing fiber substrates with a binder are stacked to obtain a laminate having the binder at least between the layers of the laminate. The laminate is heated and cooled, and the binder is fixed between the substrate layers to fix the form. As a result, a preform having the binder at least between the layers of the laminate is obtained.

A preform can be usually prepared by cutting out a reinforcing fiber substrate with a binder to which the binder is attached into a predetermined shape, stacking the cut out substrates on a mold, and applying appropriate heat and pressure. The pressure can be applied using a press, or using a method in which the laminate is enclosed with a vacuum bag film and the inside air was sucked with a vacuum pump to pressurize the laminate by the atmospheric pressure.

The reinforcing fiber included in the reinforcing fiber substrate in the present invention is not particularly limited, and examples of the reinforcing fiber include glass fibers, carbon fibers, graphite fibers, aramid fibers, boron fibers, alumina fibers, and silicon carbide fibers. Two or more kinds of these reinforcing fibers may be mixed and used. Among the reinforcing fibers, the carbon fibers and the graphite fibers are preferably used in order to obtain a fiber-reinforced composite material having further light weight and further high durability. In particular in applications where there is a high demand for weight reduction and increase in the strength of the material, the reinforcing fiber included in the reinforcing fiber substrate is preferably a carbon fiber in the fiber-reinforced composite material according to the present invention because the carbon fiber has an excellent specific elastic modulus and excellent specific strength.

As the carbon fiber, any carbon fiber can be used depending on the application, and from the viewpoint of impact resistance, the carbon fiber preferably has a tensile elastic modulus of 230 GPa or more and 400 GPa or less. From the viewpoint of strength, the carbon fiber preferably has a tensile strength of 4.4 GPa or more and 6.5 GPa or less because a composite material having high rigidity and high mechanical strength can be obtained. The tensile elongation is also an important factor, and the carbon fiber preferably has high strength and a high elongation of 1.7% or more and 2.3% or less. Therefore, the carbon fiber having the properties of a tensile elastic modulus of at least 230 GPa, a tensile strength of at least 4.4 GPa, and a tensile elongation of at least 1.7% is the most suitable.

Examples of the commercial product of the carbon fiber include "TORAYCA (registered trademark)" T800G-24K, "TORAYCA (registered trademark)" T800S-24K, "TORAYCA (registered trademark)" T700G-24K, "TORAYCA (registered trademark)" T300-3K, and "TORAYCA (registered trademark)" T700S-12K (all manufactured by Toray Industries, Inc.).

The fiber-reinforced composite material according to embodiments of the present invention includes the epoxy resin cured product of the epoxy resin composition for a fiber-reinforced composite material according to embodiments of the present invention and a reinforcing fiber in combination. In the case that the fiber-reinforced composite material is used particularly in the aircraft field, mechanical properties such as high heat resistance and bending strength are needed. In the fiber-reinforced composite material according to the present invention, the glass transition temperature of the epoxy resin cured product that is a matrix resin can be usually 180° C. or more and 200° C. or less, therefore, the fiber-reinforced composite material has excellent heat resistance and is influenced by the high mechanical property possessed by the epoxy resin cured product. As a result, the fiber-reinforced composite material according to embodiments of the present invention has a high H/W 0° compressive strength that is a compressive strength in the 0° direction under wet heat, and can exhibit a high H/W 0° compressive strength of 1,100 MPa or more, and 1,200 MPa or more in a more preferable aspect.

EXAMPLES

Hereinafter, the epoxy resin composition for a fiber-reinforced composite material and the like in the present invention will be described in more detail with reference to Examples, but the present invention is not limited thereto.

<Resin Raw Materials>

The following resin raw materials were used to obtain the resin compositions in Examples and Comparative Examples. Note that the numerical value of each component in the column of the resin composition in Tables indicates the content, and the unit of the content is "parts by mass" unless otherwise specified.

1. [A] Tetraglycidyldiaminodiphenylmethane
    "Araldite (registered trademark)" MY721 (manufactured by Huntsman Advanced Materials LLC.): tetraglycidyldiaminodiphenylmethane
2. [C] Bisphenol F Type Epoxy Resin
    "EPICLON (registered trademark)" 830 (EPC830) (manufactured by DIC Corporation): bisphenol F type epoxy resin (viscosity: 3.5 Pa·s (25° C.))
3. Epoxy Resin other than [A] and [C]
    "EPICLON (registered trademark)" 850 (EPC850) (manufactured by DIC Corporation): bisphenol A type epoxy resin (viscosity: 13 Pa·s (25° C.))
4. [B] 4,4'-Methylenebis (2-Isopropyl-6-Methylaniline)
    "Lonzacure (registered trademark)" M-MIPA (manufactured by Lonza): 4, 4'-methylenebis (2-isopropyl-6-methylaniline)
5. Curing Agent other than [B]
    "Lonzacure (registered trademark)" M-DEA (manufactured by Lonza): 4,4'-methylenebis (2, 6-diethylaniline)
    "Lonzacure (registered trademark)" M-CDEA (manufactured by Lonza): 4,4'-methylenebis (3-chloro-2, 6-diethylaniline)
6. Additive
    "Kane Ace (registered trademark)" MX-416 ("Araldite (registered trademark)" MY721: 75% by mass/core-shell rubber particle (volume average particle diameter: 100 nm, core portion: crosslinked polybutadiene [Tg: −70° C.], shell portion: methyl methacrylate/glycidyl methacrylate/styrene copolymer): 25% by mass masterbatch, manufactured by KANEKA CORPORATION)
    "STAPHYLOID (registered trademark)" AC-3355 (manufactured by Ganz Chemical Co., Ltd.): (core-shell rubber particle (volume average particle diameter: 500 nm, core portion: crosslinked polybutyl acrylate, shell portion: crosslinked polystyrene, manufactured by Ganz Chemical Co., Ltd.)

<Preparation of Epoxy Resin Composition>

An epoxy resin composition was prepared by mixing the components at the content ratio described in Tables.

<Preparation of Cured Resin Plate>

The epoxy resin composition prepared above was degassed under reduced pressure, and then injected into a mold that was set to have a thickness of 2 mm with a 2 mm-thick "Teflon (registered trademark)" spacer. The epoxy resin composition was cured at a temperature of 180° C. for 40 minutes to obtain a cured resin plate having a thickness of 2 mm.

<Preparation of Binder>

A binder was prepared in accordance with the following method of production.

(Method of Producing Binder 1)

A fiber of nylon 12 (crystalline polyamide, melting point: 176° C., glass transition temperature: 50° C.) discharged from a spinneret having one orifice was extended using an aspirator equipped with an impact plate at the tip and using compressed air, then dispersed in a wire mesh shape, and collected. The fiber sheets collected on the wire mesh was thermally bonded using a heating press machine to prepare a binder 1 having a nonwoven fabric form.

(Method of Producing Binder 2)

Using a small twin-screw extruder (S1KRC Kneader manufactured by Kurimoto, Ltd.), 15 parts by mass of a cresol novolac type epoxy resin ("EPICLON (registered trademark)" N-660 manufactured by DIC Corporation), 25 parts by mass of a bisphenol type epoxy resin ("jER (registered trademark)" 825 manufactured by Mitsubishi Chemical Corporation), and 60 parts by mass of polyether sulfone ("SUMIKAEXCEL (registered trademark)" PES5200P manufactured by SUMITOMO CHEMICAL COMPANY, LIMITED) were kneaded at a temperature of 180° C. to prepare a binder resin composition. The prepared binder resin composition was freeze-ground using liquid nitrogen with a hammer mill (PULVERIZER manufactured by HOSOKAWA MICRON CORPORATION) using a screen having a pore size of 1 mm to obtain a binder 2 having a particle form. The particles were passed through a sieve having a mesh-opening size of 150 μm and a sieve having a mesh-opening size of 75 μm, and the binder particles remaining on the sieve having a mesh-opening size of 75 μm were used for evaluation.

<Preparation of Reinforcing Fiber Substrate with Binder>

The obtained binder was attached to one side of a carbon fiber unidirectional fabric (plain weave, warp: carbon fiber T800S-24K-10C manufactured by Toray Industries, Inc., carbon fiber basis weight 295 g/m$^2$, warp density 7.2/25 mm, weft: glass fiber ECE225 I/O 1Z manufactured by NITTO BOSEKI CO., LTD., weft density 7.5/25 mm). The amount of the binder 1 attached was 10 g/m$^2$ and the amount of the binder 2 attached was 20 g/m$^2$. Then, the resulting product was heated using a far-infrared heater, and the binder was fused to obtain a reinforcing fiber substrate with a binder that was provided with the binder on one surface.

<Preparation of Preform>

The obtained reinforcing fiber substrate with a binder was cut into 395 mm×395 mm, and then the four reinforcing fiber substrates with a binder were stacked so that the carbon fiber directions of the four reinforcing fiber substrates with a binder were aligned in the 0° direction. The obtained laminate was placed on the surface of an aluminum planar mold, and covered and enclosed with a bag material (polyamide film) and a sealant. The cavity formed with the mold and the bag material was evacuated, the mold was put to a hot air dryer, the temperature was raised from room temperature to 90° C. by 3° C. per minute, and then the mold was heated at 90° C. for 2 hours. Then, while the vacuum state of the cavity was maintained, the mold was cooled to 60° C. or less in the atmosphere, and then the cavity was opened to the atmosphere to obtain a preform.

<Preparation of Fiber-Reinforced Composite Material>

The obtained preform was set in a mold having a plate-shaped cavity having a size of 400 mm×400 mm×1.2 mm, and the mold was clamped. Next, the mold was heated to 90° C., then the epoxy resin composition that was prepared as described above and previously heated to 80° C. was injected into the mold using a resin injection device under an injection pressure of 0.2 MPa. Forty minutes (curing time) after starting the injection of the epoxy resin composition, the mold was opened, and the molded product was released to obtain a fiber-reinforced composite material.

<Evaluation>

The evaluation in each Example was performed as follows. The number of measurements n is n=1 unless otherwise specified.

1. Measurement of Viscosity of Resin Composition Immediately after Preparation

The sample to be measured was measured in accordance with "Method for viscosity measurement by cone-and-plate viscometer" in JIS Z8803 (1991) using an E type viscometer equipped with a standard cone rotor (1°34'×R24) in the state that the temperature is kept at 30° C. or 80° C. As the E type viscometer, TVE-30H manufactured by TOKIMEC INC. was used. As the sample, the epoxy resin composition obtained by mixing the components and stirring the mixture for 1 minute was used. The viscosity measured at 30° C. was represented by $\eta_{30}$, and the viscosity measured at 80° C. was represented by $\eta_{80}$.

2. Viscosity Increase Rate after Standing for 1 Month at 25° C.

The sample to be measured was measured in accordance with "Method for viscosity measurement by cone-and-plate viscometer" in JIS Z8803 (1991) using an E type viscometer equipped with a standard cone rotor (1°34'×R24) in the state that the temperature is kept at 25° C. As the E type viscometer, TVE-30H manufactured by TOKIMEC INC. was used. As the sample, the epoxy resin composition obtained by mixing the components, and stirring the mixture for 1 minute or allowing the mixture to stand for 1 month at 25° C. was used. The viscosity after stirring for 1 minute was represented by $\eta_{25(T0)}$ and the viscosity after standing for 1 month at 25° C. was represented by $\eta_{25(T1)}$, and the viscosity increase rate after the standing for 1 month at 25° C. $\eta_{25(T1)}/\eta_{25(T0)}$ was determined.

3. Handleability during Refrigeration Transportation

Into a 500 ml container, 300 g of the sample to be measured was taken, and the handleability was evaluated based on the movement of the liquid surface while the temperature was kept at −20° C. In the case that the liquid surface did not move at all when the container was tilted at 45°, that the center of gravity of the sample was at the same position as that before the tilting, and that the sample was easy to transport, the handleability of the sample was judged as A. In the case that the liquid surface moved even a little when the container was tilted at 45°, and that the position of the center of gravity was changed, the sample was regarded as to be not easy to transport, and the handleability was judged as B. As the sample, the epoxy resin composition obtained by mixing the components and stirring the mixture for 1 minute was used.

4. Vitrification Time

Using a thermosetting measuring device ATD-1000 (manufactured by Alpha Technologies), the sample to be measured was put to a stage heated to 180° C., and dynamic viscoelasticity measurement was performed at a frequency of 1.0 Hz and a strain of 1% to determine the complex viscosity. At this time, the time until the complex viscosity reaches $1.0 \times 10^7$ Pa·s was regarded as the vitrification time. As the sample, the epoxy resin composition obtained by mixing the components and stirring the mixture for 1 minute was used.

5. Measurement of Glass Transition Temperature Tg of Epoxy Resin Cured Product

A test piece having a width of 12.7 mm and a length of 40 mm was cut out from the cured resin plate, and Tg was measured using DMA (ARES manufactured by TA Instruments). The measurement condition is a temperature rise rate of 5° C./min. The temperature at the inflection point of the storage elastic modulus G' obtained by the measurement was regarded as Tg.

6. Measurement of H/W 0° Compressive Strength of Fiber-Reinforced Composite Material The fiber-reinforced composite material obtained as described above was cut into a length of 79.4 mm and a width of 12.7 mm so that the 0° direction and the length direction were the same to prepare a 0° compressive strength test piece. The test piece was immersed in warm water at 72° C. for 14 days, and then the 0° compressive strength of the fiber-reinforced composite material was measured. The 0° compressive strength was measured in accordance with ASTM D695 using a material universal testing machine (4208 Instron manufactured by Instron Japan Co., Ltd.) as a testing machine at a crosshead speed during the measurement of 1.27 mm/min and a measurement temperature of 82° C.

Examples 1 to 4

As described above, [A], [B], [C], and a curing agent other than [B] were blended at the content ratio described in Table 1 to prepare an epoxy resin composition. As described in Table 2, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. Only the content ratio of [A], [B], [C], and a curing agent other than [B] was changed in Examples 1 to 4. In any case, $200 \leq \eta_{30}/\eta_{80} \leq 500$ and $50 \leq \eta_{80} \leq \eta_{80}$ were satisfied, the handleability during the refrigeration transportation was good, $\eta_{25(T1)}/\eta_{25(T0)}$ was 1.1 or less so that the stability under hold at a room temperature of 25° C. was also good, and the impregnation property into the reinforcing fiber was also good. The vitrification time at 180° C. was 40 minutes or less so that the curability was also good, and the epoxy resin cured product had a Tg of 180° C. or more and the fiber-reinforced composite material had a H/W 0° compressive strength of 1,100 MPa or more so that the heat resistance and the mechanical property were also good.

Examples 5 to 7

As described above, [A], [B], [C], and a curing agent other than [B] were blended at the content ratio described in Tables 1 and 3 to prepare an epoxy resin composition. As described in Tables 2 and 4, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. Only H/E was changed in Examples 5 to 7. In any case, $200 \leq \eta_{30}/\eta_{80} \leq 500$ and $50 \leq \eta_{80} \leq \eta_{80}$ were satisfied, the handleability during the refrigeration transportation was good, $\eta_{25(T1)}/\eta_{25(T0)}$ was 1.1 or less so that the stability under hold at a room temperature of 25° C. was also good, and the impregnation property into the reinforcing fiber was also good. The vitrification time at 180° C. was 40 minutes or less so that the curability was also good, and the epoxy resin cured product had a Tg of 180° C. or more and the fiber-reinforced composite material had a H/W 0° compressive strength of 1,100 MPa or more so that the heat resistance and the mechanical property were also good.

Examples 8 to 10

As described above, [A], [B], [C], a curing agent other than [B], and an additive were blended at the content ratio described in Table 3 to prepare an epoxy resin composition. As described in Table 4, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ Was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The kind of the additive and H/E were changed in Examples 8 to 10. In any case, 200≤$\eta_{30}$/$\eta\mu 80$≤500 and 50≤$\eta_{80}$≤$\eta_{80}$ were satisfied, the handleability during the refrigeration transportation was good, $\eta_{25(T1)}/\eta_{25(T0)}$ was 1.1 or less so that the stability under hold at a room temperature of 25° C. was also good, and the impregnation property into the reinforcing fiber was also good. The vitrification time at 180° C. was 40 minutes or less so that the curability was also good, and the epoxy resin cured product had a Tg of 180° C. or more and the fiber-reinforced composite material had a H/W 0° compressive strength of 1, 100 MPa or more so that the heat resistance and the mechanical property were also good.

Example 11

As described above, [A], [B], [C], and a curing agent other than [B] were blended at the content ratio described in Table 3 to prepare an epoxy resin composition. As described in Table 4, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. Only the kind of the binder in Example 1 was changed in Example 11. In any case, 200≤$\eta_{30}$/$\eta_{80}$≤500 and 50≤$\eta_{80}$≤$\eta_{80}$ were satisfied, the handleability during the refrigeration transportation was good, $\eta_{25(T1)}/\eta_{25(T0)}$ was 1.1 or less so that the stability under hold at a room temperature of 25° C. was also good, and the impregnation property into the reinforcing fiber was also good. The vitrification time at 180° C. was 40 minutes or less so that the curability was also good, and the epoxy resin cured product had a Tg of 180° C. or more and the fiber-reinforced composite material had a H/W 0° compressive strength of 1, 100 MPa or more so that the heat resistance and the mechanical property were also good.

Comparative Example 1

In Example 1, the amount of [C] was increased, and the components were blended at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationships 200≤$\eta_{30}$/$\eta_{80}$≤500 and 50≤$\eta_{80}$≤$\eta_{80}$ were satisfied, the handleability during the refrigeration transportation was good, $\eta_{25(T1)}/\eta_{25(T0)}$ Was 1.08 so that the stability under hold at a room temperature of 25° C. was also good, and the impregnation property into the reinforcing fiber was also good. However, the vitrification time at 180° C. was 45 minutes so that the curability was poor, and the epoxy resin cured product had a Tg of 170° C. and the fiber-reinforced composite material had a H/W 0° compressive strength of 1,090 MPa so that both the heat resistance and the mechanical property were poor.

Comparative Example 2

In Example 1, EPC850 was used instead of [C] and the components were blended at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationships 200≤$\eta_{30}$/$\eta_{80}$≤500 and 50≤$\eta_{80}$≤$\eta_{80}$ were satisfied, the handleability during the refrigeration transportation was good, $\eta_{25(T1)}/\eta_{25(T0)}$ Was 1.07 so that the stability under hold at a room temperature of 25° C. was also good, and the impregnation property into the reinforcing fiber was also good. Furthermore, the vitrification time at 180° C. was 38 minutes and the epoxy resin cured product had a Tg of 185° C. so that both the curability and the heat resistance were good, but the fiber-reinforced composite material had a H/W 0° compressive strength of 1,090 MPa so that the mechanical property was poor.

Comparative Example 3

In Example 1, the amounts of [A] and a curing agent other than [B] were increased, and the components were blended excluding [C] at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationship 200≤$\eta_{30}$/$\eta_{80}$≤500 was not satisfied, the handleability during the refrigeration transportation was poor, $\eta_{25(T1)}/\eta_{25(T0)}$ was 1.11 so that the stability under hold at a room temperature of 25° C. was also poor, but the impregnation property into the reinforcing fiber was good. Furthermore, the vitrification time at 180ºC was 41 minutes so that the curability was poor, but the epoxy resin cured product had a Tg of 182° C. and the fiber-reinforced composite material had a H/W 0° compressive strength of 1,190 MPa so that both the heat resistance and the mechanical property were good.

Comparative Example 4

In Example 1, the amounts of [A] and a curing agent other than [B] were increased, and the components were blended excluding [C] at the content ratio described in Table 5 to prepare an epoxy resin composition. As described in Table 6, $\eta_{25(T0)}$, $\eta_{30}$, and no were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationship $200 \leq \eta_{30}/\eta_{80} \leq 500$ was not satisfied, the handleability during the refrigeration transportation was poor, $\eta_{25(T1)}/\eta_{25(T0)}$ was 1.12 so that the stability under hold at a room temperature of 25° C. was also poor, but the impregnation property into the reinforcing fiber was good. Furthermore, the vitrification time at 180° C. was 43 minutes so that the curability was poor, and although the epoxy resin cured product had a Tg of 185° C. so that the heat resistance was good, the fiber-reinforced composite material had a H/W 0° compressive strength of 1,050 MPa so that the mechanical property was poor.

Comparative Example 5

In Example 1, the amount of [A] was increased, only M-CDEA was used instead of [B], and the components were blended excluding [C] at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationships $200 \leq \eta_{30}/\eta\mu80 \leq 500$ and $50 \leq \eta_{80} \leq \eta_{80}$ were satisfied, the handleability during the refrigeration transportation was good, $\eta_{25(T1)}/\eta_{25(T0)}$ Was 1.05 so that the stability under hold at a room temperature of 25° C. was also good, and the impregnation property into the reinforcing fiber was also good. However, the vitrification time at 180° C. was 180 minutes so that the curability was poor, and the epoxy resin cured product had a Tg of 150° C. and the fiber-reinforced composite material had a H/W 0° compressive strength of 800 MPa so that both the heat resistance and the mechanical property were poor.

Comparative Example 6

In Example 8, the amount of [A] was increased, and the components were blended excluding [C] at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ Was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationship $50 \leq \eta_{80} \leq \eta_{80}$ was not satisfied, and the impregnation property into the reinforcing fiber was poor. However, $\eta_{30}/\eta_{80}$ was 370 so that the handleability during the refrigeration transportation was good, and $\eta_{25(T1)}/\eta_{25(T0)}$ was 1.06 so that the stability under hold at a room temperature of 25° C. was also good. Furthermore, the vitrification time at 180° C. was 35 minutes, the epoxy resin cured product had a Tg of 185° C., and the fiber-reinforced composite material had a H/W 0° compressive strength of 1,210 MPa so that all the curability, the heat resistance, and the mechanical property were good.

Comparative Example 7

In Example 8, the amounts of [A] and [B] were increased, and the components were blended excluding [C] at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material were prepared using each epoxy resin composition, and the glass transition temperature Tg and the H/W 0° compressive strength were measured. The relationship $50 \leq \eta_{80} \leq \eta_{80}$ was not satisfied, and the impregnation property into the reinforcing fiber was poor. However, $\eta_{30}/\eta_{80}$ was 450 so that the handleability during the refrigeration transportation was good, and $\eta_{25(T1)}/\eta_{25(T0)}$ Was 1.04 so that the stability under hold at a room temperature of 25° C. was also good. Furthermore, the vitrification time at 180° C. was 38 minutes, the epoxy resin cured product had a Tg of 181° C., and the fiber-reinforced composite material had a H/W 0° compressive strength of 1,260 MPa so that all the curability, the heat resistance, and the mechanical property were good.

Comparative Example 8

In Example 8, the amounts of [A] and [B] were increased, and the components were blended excluding [C] at the content ratio described in Table 5 to prepare an epoxy resin composition. As described in Table 6, $\eta_{25(T0)}$, $\eta_{30}$, and $\eta_{80}$ were measured, each epoxy resin composition was allowed to stand for 1 month at 25° C., and the viscosity increase rate $\eta_{25(T1)}/\eta_{25(T0)}$ was determined. Furthermore, the handleability of the epoxy resin composition during refrigeration transportation was evaluated, and the vitrification time at 180° C. was measured. In addition, a cured resin plate and a fiber-reinforced composite material in which the kind of the binder was changed were prepared using each epoxy resin composition, and the glass transition temperature Tg and the H/W 0° compressive strength were measured. The relationship $50 \leq \eta_{80} \leq \eta_{80}$ was not satisfied, and the impregnation property into the reinforcing fiber was poor. However, $\eta_{30}/\eta_{80}$ was 450 so that the handleability during the refrigeration transportation was good, and $\eta_{25(T1)}/\eta_{25(T0)}$ was 1.04 so that the stability under hold at a room temperature of 25° C. was also good. Furthermore, the vitrification time at 180° C. was 38 minutes, the epoxy resin cured product had a Tg of 181° C., and the fiber-reinforced composite material had a H/W 0° compressive strength of 1,100 MPa so that all the curability, the heat resistance, and the mechanical property were good.

TABLE 1

| | | | Example 1 | Example 2 | Example 3 | Example 4 | Example 5 | Example 6 |
|---|---|---|---|---|---|---|---|---|
| Epoxy resin composition | [A] Tetraglycidyldiamino-diphenylmethane | MY721 | 70 | 80 | 90 | 80 | 80 | 80 |
| | [C] Bisphenol F type epoxy resin | EPC830 | 30 | 20 | 10 | 20 | 20 | 20 |
| | Epoxy resin other than [A] and [C] | EPC850 | 0 | 0 | 0 | 0 | 0 | 0 |
| | [B] 4, 4'-Methylenebis (2-isopropyl-6-methylaniline) | M-MIPA | 68 | 71 | 74 | 57 | 65 | 91 |
| | Curing agent other than [B] | M-DEA | 0 | 0 | 0 | 14 | 0 | 0 |
| | | M-CDEA | 0 | 0 | 0 | 0 | 0 | 0 |
| | Additive | MX-416 Volume average particle diameter: 100 nm Value in [ ]: amount of blended core-shell rubber particle | 0 [0] | 0 [0] | 0 [0] | 0 [0] | 0 [0] | 0 [0] |
| | | AC-3355 Volume average particle diameter: 500 nm Value in [ ]: amount of blended core-shell rubber particle | 0 [0] | 0 [0] | 0 [0] | 0 [0] | 0 [0] | 0 [0] |
| | | H/E | 1.1 | 1.1 | 1.1 | 1.1 | 1.0 | 1.4 |
| Binder | | Kind | 1 | 1 | 1 | 1 | 1 | 1 |
| | | Form | Nonwoven fabric | Nonwoven fabric | Nonwoven fabric | Nonwoven fabric | Nonwoven fabric | Nonwoven fabric |

TABLE 2

| | | Example 1 | Example 2 | Example 3 | Example 4 | Example 5 | Example 6 |
|---|---|---|---|---|---|---|---|
| Properties of uncured resin | $\eta_{30}/\eta_{80}$ | 360 | 370 | 375 | 220 | 360 | 400 |
| | $\eta_{80}$ [mPa·s] | 105 | 110 | 115 | 100 | 105 | 160 |
| | Handleability during refrigeration transportation | A | A | A | A | A | A |
| | $\eta_{25(T1)}/\eta_{25(T0)}$ | 1.07 | 1.06 | 1.05 | 1.10 | 1.07 | 1.04 |
| | Vitrification time [min] | 35 | 34 | 33 | 40 | 35 | 37 |
| Property of epoxy resin cured product | Glass transition temperature [° C.] | 180 | 187 | 189 | 180 | 189 | 183 |
| Property of fiber-reinforced composite material | H/W 0° Compressive strength [MPa] | 1200 | 1220 | 1240 | 1180 | 1190 | 1270 |

TABLE 3

| | | | Example 7 | Example 9 | Example 10 | Example 11 |
|---|---|---|---|---|---|---|
| Epoxy resin composition | [A] Tetraglycidyldiamino-diphenylmethane | MY721 | 80 | 65 | 80 | 65 | 70 |
| | [C] Bisphenol F type epoxy resin | EPC830 | 20 | 20 | 20 | 20 | 30 |
| | Epoxy resin other than [A] and [C] | EPC850 | 0 | 0 | 0 | 0 | 0 |

TABLE 3-continued

|  |  |  | Example 7 | Example 8 | Example 9 | Example 10 | Example 11 |
|---|---|---|---|---|---|---|---|
|  | [B] 4,4'-Methylenebis (2-isopropyl-6-methylaniline) | M-MIPA | 98 | 71 | 71 | 78 | 68 |
|  | Curing agent other than [B] | M-DEA | 0 | 0 | 0 | 0 | 0 |
|  |  | M-CDEA | 0 | 0 | 0 | 0 | 0 |
|  | Additive | MX-416 | 0 | 20 | 0 | 20 | 0 |
|  |  | Volume average particle diameter: 100 nm Value in [ ]: amount of blended core-shell rubber particle | [0] | [5] | [0] | [5] | [0] |
|  |  | AC-3355 | 0 | 0 | 5 | 0 | 0 |
|  |  | Volume average particle diameter: 500 nm Value in [ ]: amount of blended core-shell rubber particle | [0] | [0] | [5] | [0] | [0] |
|  |  | H/E | 1.5 | 1.1 | 1.1 | 1.2 | 1.1 |
| Binder |  | Kind | 1 | 1 | 1 | 1 | 2 |
|  |  | Form | Nonwoven fabric | Nonwoven fabric | Nonwoven fabric | Nonwoven fabric | Particle |

TABLE 4

|  |  | Example 7 | Example 8 | Example 9 | Example 10 | Example 11 |
|---|---|---|---|---|---|---|
| Properties of uncured resin | $\eta_{30}/\eta_{80}$ | 460 | 370 | 370 | 390 | 360 |
|  | $\eta_{80}$ [mPa·s] | 180 | 130 | 110 | 140 | 105 |
|  | Handleability during refrigeration transportation | A | A | A | A | A |
|  | $\eta_{25(T1)}/\eta_{25(T0)}$ | 1.04 | 1.06 | 1.06 | 1.05 | 1.07 |
|  | Vitrification time [min] | 39 | 34 | 34 | 35 | 35 |
| Property of epoxy resin cured product | Glass transition temperature [°C] | 180 | 187 | 187 | 185 | 180 |
| Property of fiber-reinforced composite material | H/W 0° Compressive strength [MPa] | 1190 | 1200 | 1150 | 1220 | 1140 |

TABLE 5

|  |  |  | Comparative Example 1 | Comparative Example 2 | Comparative Example 3 | Comparative Example 4 | Comparative Example 5 |
|---|---|---|---|---|---|---|---|
| Epoxy resin composition | [A] Tetraglycidyldiamino-diphenylmethane | MY721 | 60 | 70 | 100 | 100 | 100 |
|  | [C] Bisphenol F type epoxy resin | EPC830 | 40 | 0 | 0 | 0 | 0 |
|  | Epoxy resin other than [A] and [C] | EPC850 | 0 | 30 | 0 | 0 | 0 |
|  | [B] 4,4'-Methylenebis (2-isopropyl-6-methylaniline) | M-MIPA | 66 | 67 | 54 | 26 | 0 |
|  | Curing agent other than [B] | M-DEA | 0 | 0 | 23 | 44 | 0 |
|  |  | M-CDEA | 0 | 0 | 0 | 0 | 92 |
|  | Additive | MX-416 | 0 | 0 | 0 | 0 | 0 |
|  |  | Volume average particle diameter: 100 nm Value in [ ]: amount of blended core-shell rubber particle | [0] | [0] | [0] | [0] | [0] |

TABLE 5-continued

|  |  |  |  |  |  |  |  |
|---|---|---|---|---|---|---|---|
|  |  | AC-3355 Volume average particle diameter: 500 nm Value in [ ]: amount of blended core-shell rubber particle | 0 [0] | 0 [0] | 0 [0] | 0 [0] | 0 [0] |
| Binder |  | H/E Kind Form | 1.1 1 Nonwoven fabric | 1.1 1 Nonwoven fabric | 1.1 1 Nonwoven fabric | 1.0 1 Non woven fabric | 1.1 1 Nonwoven fabric |

|  |  |  |  | Comparative Example 6 | Comparative Example 7 | Comparative Example 8 |
|---|---|---|---|---|---|---|
| Epoxy resin composition | [A] Tetraglycidyldiamino-diphenylmethane | MY721 | 85 | 85 | 85 |  |
|  | [C] Bisphenol F type epoxy resin | EPC8 30 | 0 | 0 | 0 |  |
|  | Epoxy resin other than [A] and [C] | EPC850 | 0 | 0 | 0 |  |
|  | [B] 4, 4'-Methylenebis (2-isopropyl-6-methylaniline) | M-MI PA | 76 | 97 | 97 |  |
|  | Curing agent other than [B] | M-DEA | 0 | 0 | 0 |  |
|  |  | M-CDEA | 0 | 0 | 0 |  |
|  | Additive | MX-416 Volume average particle diameter: 100 nm Value in [ ]: amount of blended core-shell rubber particle | 20 [5] | 20 [5] | 20 [5] |  |
|  |  | AC-3355 Volume average particle diameter: 500 nm Value in [ ]: amount of blended core-shell rubber particle | 0 [0] | 0 [0] | 0 [0] |  |
| Binder |  | H/E Kind Form | 1.1 1 Nonwoven fabric | 1.4 1 Nonwoven fabric | 1.4 2 Particle |  |

TABLE 6

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Properties of uncured resin | $\eta_{30}/\eta_{80}$ | 350 | 360 | 190 | 140 | 380 | 370 | 450 | 450 |
|  | $\eta_{80}$ [mPa·s] | 100 | 130 | 135 | 130 | 120 | 185 | 190 | 190 |
|  | Handleability during refrigeration transportation | A | A | B | B | A | A | A | A |
|  | $\eta_{25(T1)}/\eta_{25(T0)}$ | 1.08 | 1.07 | 1.11 | 1.12 | 1.05 | 1.06 | 1.04 | 1.04 |
|  | Vitrification time [min] | 45 | 38 | 41 | 43 | 180 | 35 | 38 | 38 |
| Property of epoxy resin cured product | Glass transition temperature [°C] | 170 | 185 | 182 | 185 | 150 | 185 | 181 | 181 |
| Property of fiber-reinforced composite material | H/W 0° Compressive strength [MPa] | 1090 | 1090 | 1190 | 1050 | 800 | 1210 | 1260 | 1100 |

INDUSTRIAL APPLICABILITY

The epoxy resin composition for a fiber-reinforced composite material according to embodiments of the present invention is excellent in the handleability during the refrigeration transportation, the stability under hold at room temperature, and the impregnation property into the reinforcing fiber, good in the processability, and excellent also in the high-speed curability and the high heat resistance, therefore, a fiber-reinforced composite material having high strength can be provided by an RTM method or the like with high productivity. As a result, the fiber-reinforced composite material is increasingly employed especially for aircraft and automobiles, and it can be expected that the further weight reduction of aircraft and automobiles leads to the fuel consumption improvement and contribution to reduction of global warming gas emission.

The invention claimed is:

1. An epoxy resin composition for a fiber-reinforced composite material, the epoxy resin composition comprising:
   an epoxy resin; and
   a curing agent,
   the fiber-reinforced composite material is able to be produced in which the epoxy resin composition is injected and impregnated into a reinforcing fiber substrate placed in a heated mold, and cured in the mold, wherein
   tetraglycidyldiaminodiphenylmethane [A] is contained at a content of 70 parts by mass or more and 90 parts by mass or less based on 100 parts by mass of all epoxy resin components,
   4,4'-methylenebis(2-isopropyl-6-methylaniline) [B] is contained at a content of 80 parts by mass or more and 100 parts by mass or less based on 100 parts by mass of a total curing agent component,
   a bisphenol F type epoxy resin [C] is contained at a content of 10 parts by mass or more and 30 parts by mass or less based on 100 parts by mass of all the epoxy resin components,
   a resin viscosity at 30° C. represented by $\eta_{30}$ (unit: mPa·s) and a resin viscosity at 80° C. represented by $\eta_{80}$ (unit: mPa·s) satisfy $200 \leq \eta_{30}/\eta_{80} \leq 500$ and $50 \leq \eta_{80} \leq 180$, and
   the reinforcing fiber substrate is a preform having a connection by a binder having a nonwoven fabric form made of nylon 12.

2. The epoxy resin composition for a fiber-reinforced composite material according to claim 1, wherein a reinforcing fiber included in the reinforcing fiber substrate, of the fiber-reinforced composite material, is a carbon fiber.

3. The epoxy resin composition for a fiber-reinforced composite material according to claim 1, the epoxy resin composition including a core-shell rubber particle including an epoxy group in a shell portion, wherein the core-shell rubber particle has a volume average particle diameter in a range of 50 nm or more and 300 nm or less.

4. The epoxy resin composition for a fiber-reinforced composite material according to claim 1, wherein a ratio H/E of a total number of active hydrogens of an amine compound contained in the curing agent (H) to a total number of epoxy groups contained in the epoxy resin (E) is 1.1 or more and 1.4 or less.

5. The epoxy resin composition for a fiber-reinforced composite material according to claim 1, wherein an epoxy resin cured product cured at 180° C. for 40 minutes has a glass transition temperature Tg of 180° C. or more and 200° C. or less.

6. A method for producing a fiber-reinforced composite material, the method comprising:
   injecting the epoxy resin composition for a fiber-reinforced composite material according to claim 1, the epoxy resin composition heated to 50° C. or more and 120° C. or less, into a reinforcing fiber substrate placed in a mold heated to 90° C. or more and 180° C. or less;
   impregnating the epoxy resin composition into the reinforcing fiber substrate; and
   curing the epoxy resin composition in the mold.

7. The method according to claim 6, wherein a reinforcing fiber included in the reinforcing fiber substrate is a carbon fiber.

8. The method according to claim 6, wherein the reinforcing fiber substrate is a preform having a connection by a binder having a nonwoven fabric form.

9. A fiber-reinforced composite material comprising:
   the epoxy resin cured product of the epoxy resin composition for a fiber-reinforced composite material according to claim 1; and
   a reinforcing fiber substrate in combination.

10. The fiber-reinforced composite material according to claim 9, wherein a reinforcing fiber included in the reinforcing fiber substrate is a carbon fiber.

11. The fiber-reinforced composite material according to claim 9, wherein the reinforcing fiber substrate is a preform having a connection by a binder having a nonwoven fabric form.

* * * * *